United States Patent
Lowe

(10) Patent No.: US 8,171,641 B2
(45) Date of Patent: May 8, 2012

(54) VEHICLE FRAMING METHOD AND FRAME

(75) Inventor: James W. Lowe, Temperance, MI (US)

(73) Assignee: Ford Motor Company, Dearborn, MI (US)

( * ) Notice: Subject to any disclaimer, the term of this patent is extended or adjusted under 35 U.S.C. 154(b) by 1476 days.

(21) Appl. No.: 11/678,113

(22) Filed: Feb. 23, 2007

(65) Prior Publication Data

US 2008/0203768 A1 Aug. 28, 2008

(51) Int. Cl.
*B21D 53/88* (2006.01)

(52) U.S. Cl. ........ 29/897.2; 29/421.1; 29/429; 296/204; 296/205

(58) Field of Classification Search ................ 29/897.2, 29/421.1, 429; 296/204, 205
See application file for complete search history.

(56) References Cited

U.S. PATENT DOCUMENTS

| | | | |
|---|---|---|---|
| 4,422,685 A | 12/1983 | Bonfilio et al. | |
| 4,881,756 A | 11/1989 | Kumasaka et al. | |
| 5,401,056 A | 3/1995 | Eastman | |
| 5,549,352 A | 8/1996 | Janotik et al. | |
| 5,765,906 A * | 6/1998 | Iwatsuki et al. | 296/203.03 |
| 5,839,777 A | 11/1998 | Vlahovic | |
| 5,934,397 A | 8/1999 | Schaper | |
| 6,022,070 A * | 2/2000 | Ashina et al. | 296/205 |
| 6,092,865 A * | 7/2000 | Jaekel et al. | 296/205 |
| 6,302,478 B1 * | 10/2001 | Jaekel et al. | 296/205 |
| 6,416,119 B1 | 7/2002 | Gericke et al. | |
| 6,470,990 B1 | 10/2002 | Panoz | |
| 6,533,348 B1 | 3/2003 | Jaekel et al. | |
| 6,623,067 B2 * | 9/2003 | Gabbianelli et al. | 296/205 |
| 6,824,204 B2 * | 11/2004 | Gabbianelli et al. | 296/205 |
| 6,948,768 B2 * | 9/2005 | Corcoran et al. | 296/190.08 |
| 2001/0033096 A1 | 10/2001 | Hanyu | |
| 2004/0104568 A1 | 6/2004 | Tronville et al. | |
| 2004/0104601 A1 | 6/2004 | Durand | |

FOREIGN PATENT DOCUMENTS

| | | |
|---|---|---|
| EP | 0 568 215 A1 | 3/1993 |
| GB | 1 514 631 | 6/1978 |
| GB | 2 305 639 A | 4/1997 |

OTHER PUBLICATIONS

GB Search Report for GB0802377.2 dated Jun. 12, 2008.

* cited by examiner

*Primary Examiner* — David Bryant
*Assistant Examiner* — Bayan Salone
(74) *Attorney, Agent, or Firm* — Raymond L. Coppiellie; Brooks Kushman P.C.

(57) ABSTRACT

A method is provided for assembling a vehicle frame from hydro-formed tubular metal components. Each hydro-formed component has a surface feature that is complementary to a surface feature on an adjacent component. The complementary surface features allow the hydro-formed components to be interlocked together. The components are permanently joined by a plurality of welds. A front hoop, a rear hoop and right and left side hoops may be assembled and joined together to form the passenger compartment portion of the vehicle frame.

7 Claims, 5 Drawing Sheets

VEHICLE FRAMING METHOD AND FRAME

BACKGROUND OF THE INVENTION

1. Field of the Invention

The present invention relates to a method of assembling a vehicle frame with components constructed from hydro-formed tubular members without a framing fixture.

2. Background Art

One method of vehicle frame assembly is referred to as a balloon build method in which the vehicle frame is established by connecting a stamped metal front body section with a stamped metal rear body section. This process maintains several advantages which include a smaller manufacturing floor footprint and less manufacturing tooling requirements. However, this method of assembly presents some unsatisfactory disadvantages such as an unacceptable side door opening dimension variation, wind noise, and water leakage. Dimensional errors usually occur in one of two fashions. First, the front and rear components are constructed in a metal stamping process. Metal stamping processes suffer from the need to allow tolerances that may stack-up from part to part and cause a variance in vehicle lengths. Second, variance in vehicle length may also occur if the front and rear components of the vehicle frame are not correctly assembled prior to welding.

Another method of vehicle frame assembly is known as the multi-piece body side build wherein a plurality of smaller components are assembled and joined together to form the overall vehicle frame. This method improves the side door opening dimensions and provides more acceptable cross car dimensions. However, because many of the smaller components are constructed using a metal stamping process, acceptable variations known as tolerances occur for each of the components. These component variations result in tolerance stack-up when the components are joined together. Due to tolerance stack-up, this method is not able to rectify the wind noise or water leakage problems that had occurred in the balloon build method. Also, this process increases the manufacturing tool and floor space required to accommodate assembling the smaller components.

Another method of vehicle frame assembly is known as a one-piece body side method. This process requires the structural end item components to be added to the mainline body side process. Larger portions of the vehicle such as the body side door opening panel, roof, and underbody are assembled to the mainline body. This process eliminates the gaps found in both the previous methods. Also, this method virtually eliminates any wind noise or water leakage caused by tolerance stack-up or imperfect joining of body parts. However, this process requires an extremely large investment in body side fixtures to assemble large components, such as a body side door opening panel assembly.

The previously demonstrated methods improved on vehicle design. The balloon build method offers simplicity and low cost to build, but presents end result errors in how the vehicle body is joined together. Furthermore, the multi-piece body side build method improves side door opening dimensions, but does not solve the concerns of wind noise and water leakage. Lastly, the one-piece body side method aids in solving many manufacturing process problems, however, the investment cost and amount of manufacturing floor space are substantial disadvantages.

The above problems and others are addressed according to the method of the present invention.

SUMMARY OF THE INVENTION

A method is provided for assembling a frame of a vehicle using components that are each formed from a single piece of metal. For example, the components may be hydro-formed, extruded or die cast components. A first surface feature is formed to extend along a first mating side of a first vehicle frame component. A second surface feature is formed to extend along a second mating side of a second vehicle frame component. The first surface feature is complementary to the second surface feature in that the first and second mating sides fit together. The first vehicle frame component and the second vehicle frame component are assembled together with the first surface feature interlocking with the second surface feature. This interlocking assembly is accomplished by locating the first vehicle frame component with the second vehicle frame component so that the first mating side lies flush with the second mating side. Then, the first vehicle frame component and the second vehicle frame component are joined together.

The first surface feature may be elongated in a first direction that is parallel to the first vehicle frame component at the location of the first surface feature. The step of hydro-forming the first vehicle frame component may further comprise forming a step that extends transverse to the first direction. The first surface feature may comprise a protrusion and the second surface feature may comprise an indentation.

The first vehicle frame component and the second vehicle frame may be permanently joined by a weld, such as a laser weld, mig weld, or spot weld.

The method may further comprise stamping a reinforcement beam and assembling the reinforcement beam to two spaced locations on one of the vehicle frame components thereby forming a subassembly. The subassembly is formed before the first vehicle frame component is assembled to the second vehicle frame component.

A plurality of the first surface features and a plurality of the second surface features may be provided on the first vehicle frame component and the second vehicle frame component, respectively. The first surface features and the second surface features join the first vehicle frame component and the second vehicle frame component together.

The vehicle frame component may have a plurality of peripherally spaced locating surface features disposed about the component, whereby one vehicle frame component may be assembled and joined to multiple other vehicle frame components.

In another embodiment of the method of assembling a vehicle frame, a plurality of inverted U-shaped members are hydro-formed. Each U-shaped member has a pair of spaced lower ends. Also, a plurality of reinforcement members are formed.

A vehicle subassembly is formed when at least one of the reinforcement members is assembled and joined to the pair of spaced lower ends of one of the inverted U-shaped members. The joining of these two members establishes the spread of the vehicle subassembly as measured between the pair of spaced lower ends. Furthermore, the reinforcement member also establishes the distance from the stamped metal reinforcement member to the top of the inverted U-shaped member. The vehicle frame is assembled by joining a plurality of laterally adjacent vehicle subassemblies together.

The vehicle frame is assembled by interlocking the locating surface feature of one vehicle subassembly U-shaped member with the locating feature of another vehicle subassembly U-shaped member. The locating surface features of the vehicle subassemblies U-shaped members can interlock in at least two spatial axes.

The method of assembling the vehicle frame may also include forming and joining a passenger compartment pan to the vehicle subassemblies. The top of the vehicle side subassemblies U-shaped members will define the height of the overall vehicle once the side subassemblies reinforcement members are joined to the passenger compartment pan. The vehicle front subassembly can then be joined to the passenger compartment pan by mating the locating surface features of the vehicle side subassemblies with the locating surface features of the vehicle front subassembly and securing the reinforcement member of the front subassembly to the passenger compartment pan. The vehicle rear subassembly can also be joined to the passenger compartment pan by joining the locating surface features of the vehicle side subassembly with the locating surface locating features of the vehicle rear subassembly and then joining the rear subassembly reinforcement member to the passenger compartment pan.

A vehicle frame is provided that is formed by a rear hoop, a front hoop and right and left side hoops. The rear hoop has a right rear hoop locating surface feature and a left rear hoop locating surface feature. The right side hoop has a front right side locating surface feature and a rear right side locating surface feature. The left side hoop has a front left side locating surface feature and a rear left side locating surface feature. The front hoop has a right front hoop locating surface feature and a left front hoop locating surface feature. The front hoop is assembled and joined to the right side hoop with the right front hoop locating surface feature engaging the front right side locating surface feature. The front hoop is assembled and joined to the left side hoop with the left front hoop locating surface feature engaging the front left side locating surface feature. The rear hoop is assembled and joined to the right side hoop with the right rear hoop locating surface feature engaging the rear right side locating surface feature. The rear hoop is assembled and joined to the left side hoop with the left rear hoop locating surface feature engaging the rear left side locating surface feature.

The aspects of Applicant's invention summarized above and other aspects will be better understood in view of the attached drawings and the following detailed description of the illustrated embodiments of the invention.

DETAILED DESCRIPTION OF THE PREFERRED EMBODIMENT(S)

Detailed embodiments of the present invention are disclosed herein. It is understood, however, that the disclosed embodiments are merely exemplary of the invention that may be embodied in various and alternative forms. Thus, specific details disclosed herein are not to be interpreted as limiting, but merely as a representative basis for teaching one skilled in the art to practice the present invention.

Figure 1:
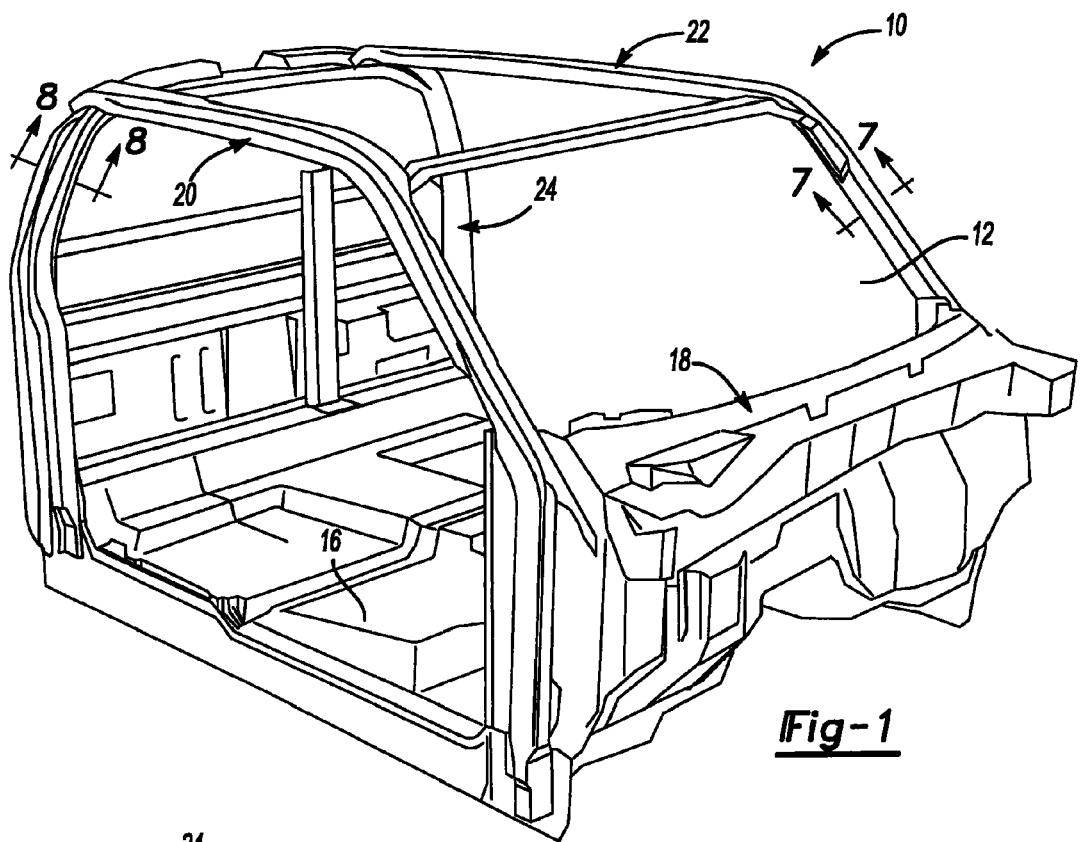
FIG. 1 is a perspective view of a fully assembled vehicle frame.
Figure 2:
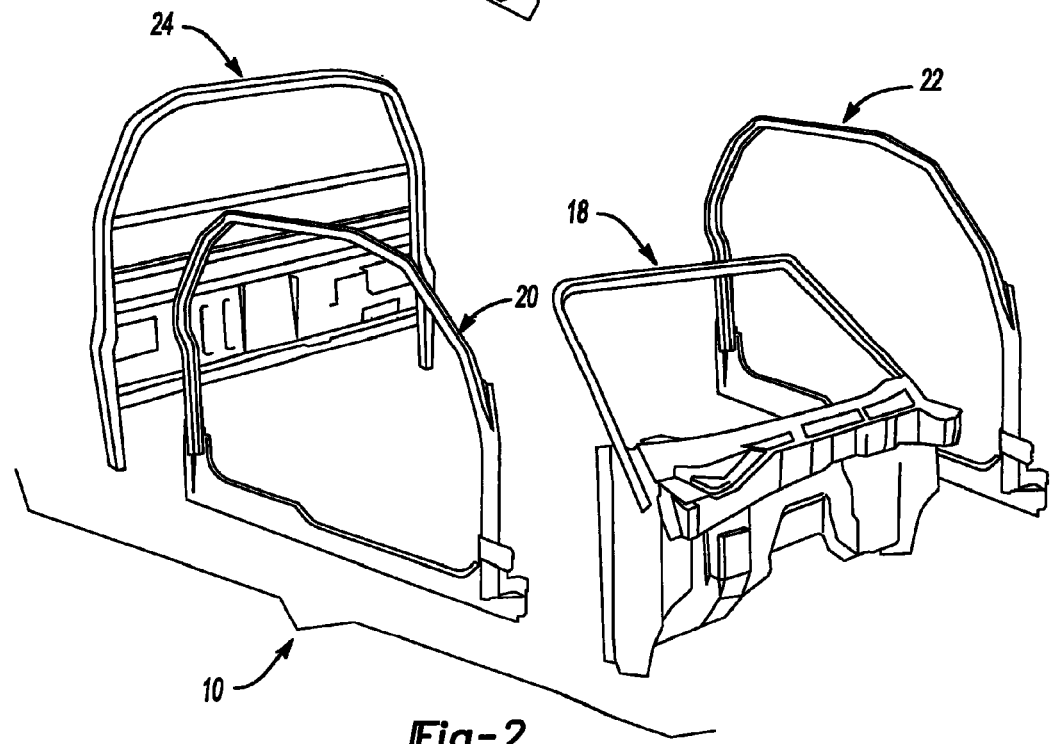
FIG. 2 is an exploded perspective view of the vehicle frame.

Referring to FIGS. 1 and 2, a vehicle frame 10, in particular, the portion of the vehicle frame surrounding the passenger compartment 12, is illustrated. A compartment pan 16 is provided under the passenger compartment 12. A front hoop assembly 18 interconnects a right door frame hoop assembly 20 and a left door frame hoop assembly 22. A rear hoop assembly 24 interconnects the right door frame hoop assembly 20 and the left door frame hoop assembly 22. The component parts of the hoop assembly 18-24 will be described more particularly below.

Figure 3:
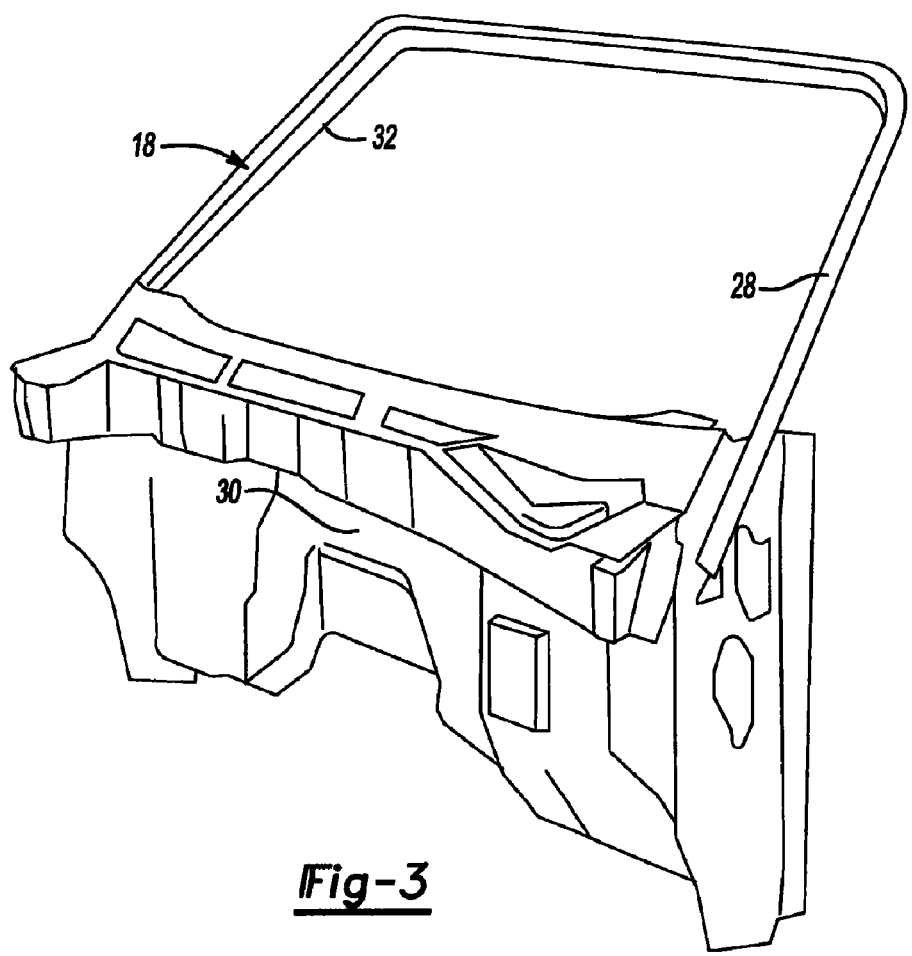
FIG. 3 is a perspective view of the vehicle front subassembly.

Referring to FIG. 3, the front hoop assembly 18 includes a windshield frame 28 and a front cross car assembly 30. The windshield frame 28 includes a surface feature 32, such as a rib, lip or ledge that is used to locate the right and left door frame hoop assemblies 20 and 22.

Figure 4:
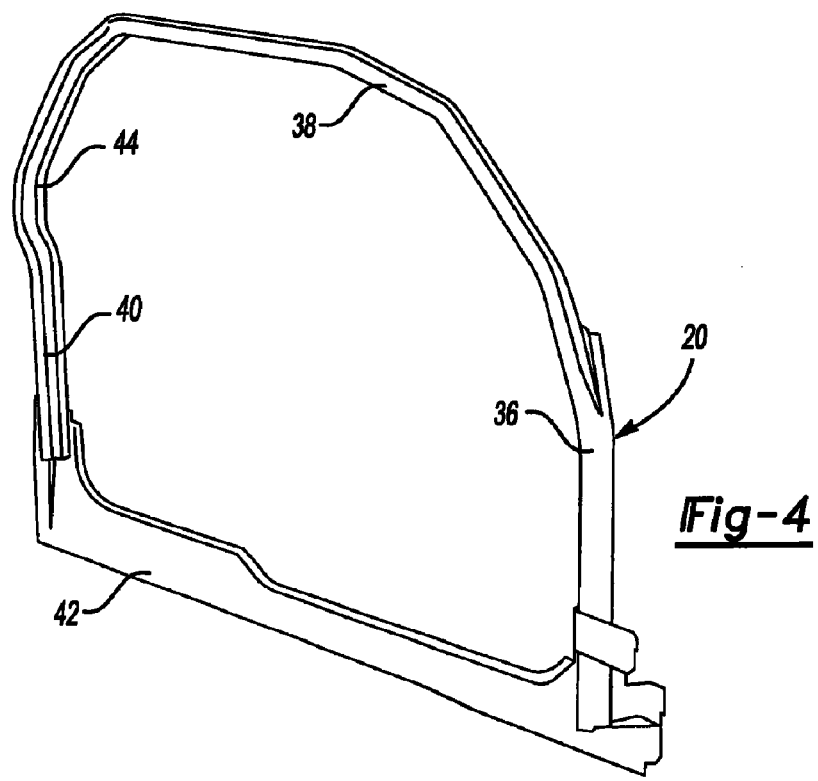
FIG. 4 is a perspective view of the vehicle side subassembly.

Referring to FIG. 4, a right door frame hoop assembly 20 is shown in isolation. The right door frame hoop assembly 20 has a right hinge pillar portion 36, a right roof rail portion 38, and a right body lock pillar portion 40. The left door frame hoop assembly 22 is substantially similar to, and in many respects is a mirror image of the right door frame hoop assembly 20. The left door frame hoop assembly 22 is not described separately to avoid duplication. Also, hereinafter the right door frame hoop assembly's 20 components will be referred to generically as the hinge pillar portion 36, roof rail portion 38, and body lock pillar portion 40. The right hinge pillar portion 36 is assembled to the front hoop assembly 18 generally in alignment with the front cross car assembly 30. The roof rail portion 38 extends from the hinge pillar portion 36 rearwardly to the right body lock pillar portion 40. The roof rail portion 38 is assembled to the front hoop assembly 18 adjacent one side of the windshield frame 28. The roof rail portion 38 forms part of vehicle frame 10 that is located below and supports the roof above the passenger compartment 12. The rocker panel 42 interconnects the lower ends of the hinge pillar portion 36 and the body lock pillar portion 40. The rocker panel 42 completes the door frame hoop assembly 20 and maintains the proper spacing between the hinge pillar portion 36 and the body lock pillar portion 40. A surface feature 44 is provided that extends along the length of one or more of the hinge pillar portion 36, roof rail portion 38, and body lock pillar portion 40. The surface feature 44 is a rib, lip, ledge or the like. The surface feature 44 at the right roof rail portion 38 preferably engages the surface feature 32 formed on one side of the windshield frame 28.

Figure 5:
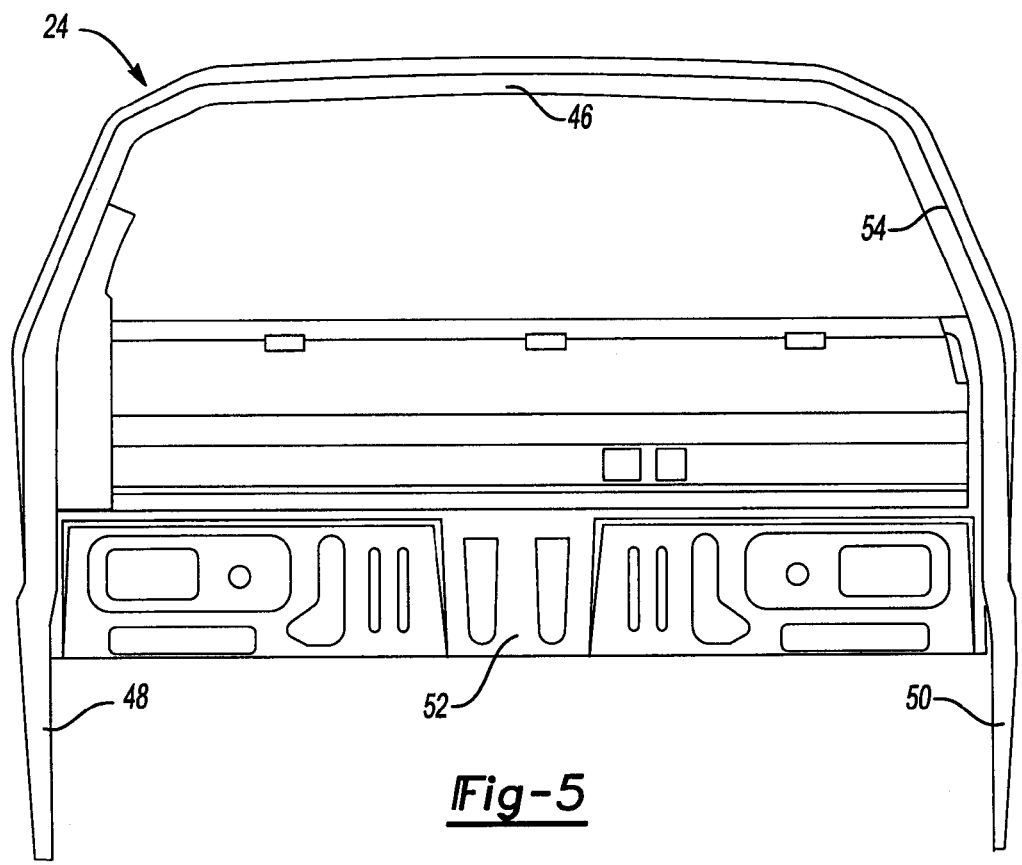
FIG. 5 is a perspective view of the vehicle rear subassembly.

Referring to FIG. 5, the rear hoop assembly 24 is shown in isolation. The rear hoop assembly 24 includes a back light frame portion 46 that is adapted to partially define the back light where a window is assembled to the passenger compartment 12. The rear hoop assembly 24 also includes a right body lock pillar portion 48 and a left body lock pillar portion 50. The body lock pillar portions 48, 50 extend downwardly from the back light frame portion 46. The right and left body lock pillar portions 48, 50 are interconnected by a rear wall 52 of the passenger compartment 12. The spacing between the right and left body lock pillar portions 48, 50 are established and maintained by their connection to the rear wall 52. A surface feature 54 is formed on the rear hoop assembly 24 to facilitate locating the rear hoop assembly 24 relative to the right and left door frame hoop assemblies 20, 22. The surface feature 54 is a rib, lip, ledge or the like that extends the length of the body lock pillar portions 48, 50. The surface feature may also extend along portions of the back light frame 46.

In summary, the vehicle frame 10 comprises rear hoop assembly 24 that has locating surface features for locating the right door frame hoop assembly 20 on the right side and the left door frame hoop assembly 22 on the left side. The right door frame hoop assembly 20 has a locating surface feature 44 that is used to locate the front hoop assembly 18 on its front end and the rear hoop assembly 24 on its rear end. The front hoop assembly 18 has a surface feature 32 that is used to locate the right and left door frame hoop assemblies 20 and 22. The front hoop assembly 18 is assembled and joined to the right door frame hoop assembly 20 on one side and the left door frame hoop assembly 22 on the left side. The respective locating surface features 32 and 44 are assembled together. The rear hoop assembly 24 is assembled and joined to the right door frame hoop assembly 20 with their respective locating surface features 44 and 54 being assembled together. Similarly, the rear hoop is assembled and joined to the right door frame hoop assembly 20 with the respective surface features 44 and 54 engaging each other to establish the proper location for the vehicle frame assembly.

The structure and function of the surface features 32, 44 and 54 will be described with reference to FIGS. 6-11 in greater detail.

Figure 6:
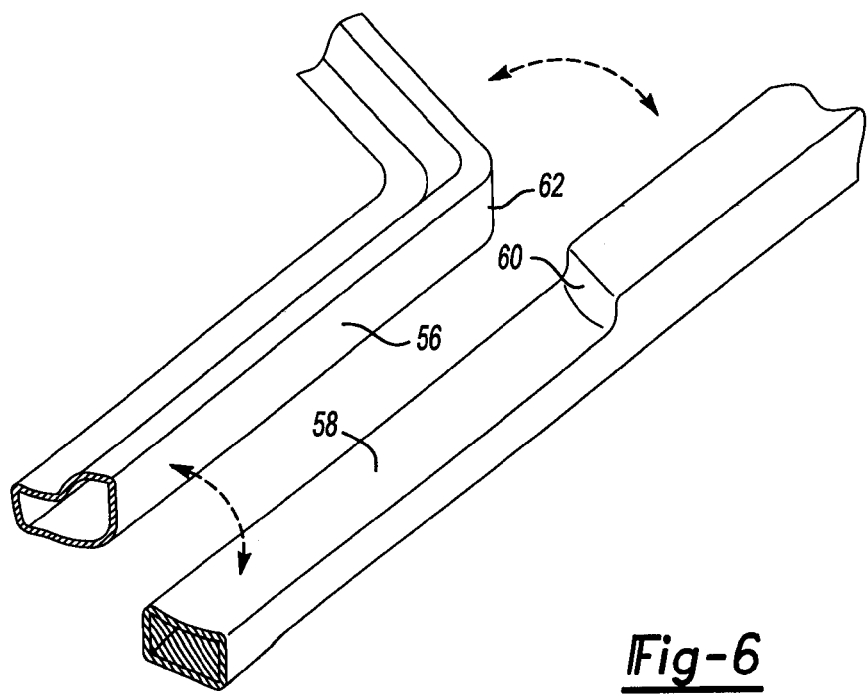
FIG. 6 is a sectional view of two hydro-formed vehicle frame components.

Referring to FIG. 6, one method of assembling complimentary surface features together is described. The hoop assemblies 18-24 are generally hydro-formed beams that may be assembled with a first mating side 56 engaging a second mating side 58 of an adjacent beam. A transverse locating feature 60 may be provided on one beam adjacent the second mating side 58 that engages a bend 62 formed proximate the first mating side 56 to establish the relative positions and location of the adjacent hydro-formed hoop assemblies.

Figure 7:
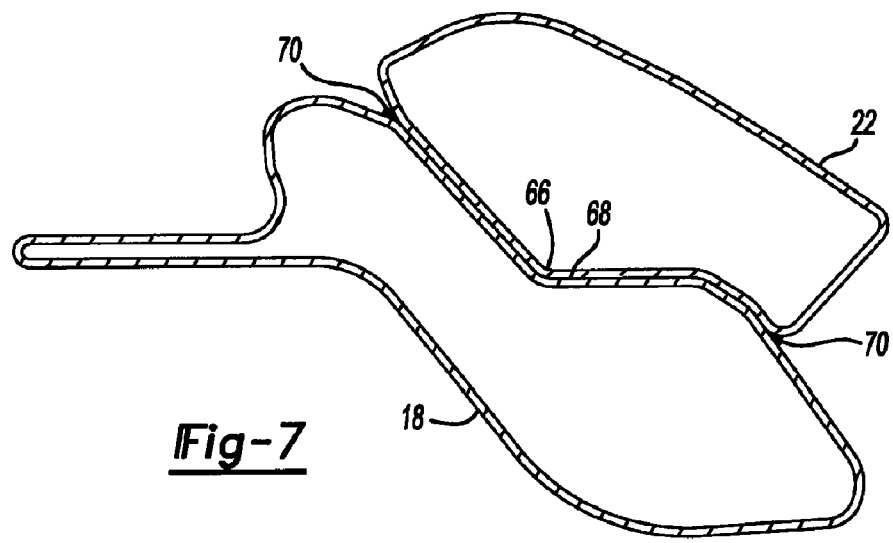
FIG. 7 is a sectional view taken along the line 7-7 in FIG. 1.

Referring to FIG. 7, an example of two complimentary surface features is shown. One of the hoop assemblies may include a hydro-formed beam having a ridge 66 that extends lengthwise to form one part of the locating feature. The adjacent hydro-formed beam defines a valley 68 that extends lengthwise to form a locating feature. Welds 70 may be formed as shown that extend continuously or discontinuously in the seam formed by the co-location of the adjacent hoop assemblies 18-24.

Figure 8:
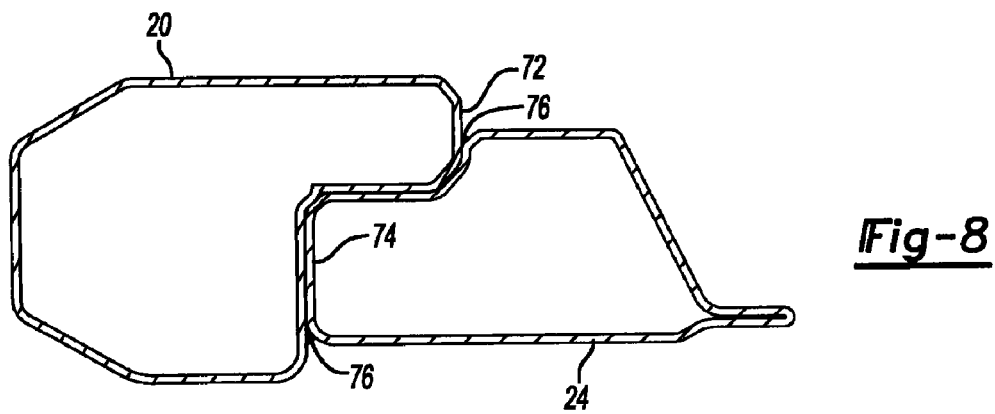
FIG. 8 is a sectional view taken along the line 8-8 in FIG. 1.

Referring to FIG. 8, another example of a surface feature is shown wherein a first protrusion 72 is formed by one hydro-formed beam that is located and secured to a second protrusion 74 formed on an adjacent hydro-formed beam of one of the hoop assemblies 18-24. Welds 76 are formed at the seam defined at the location where the first and second protrusions 72 and 74 are assembled together. The welds 76 may be continuous or discontinuous and may be formed, in one example, by a laser welding tool. Alternatively, a mig welder or a tig welder could be used to form the welds 76.

Figure 9:
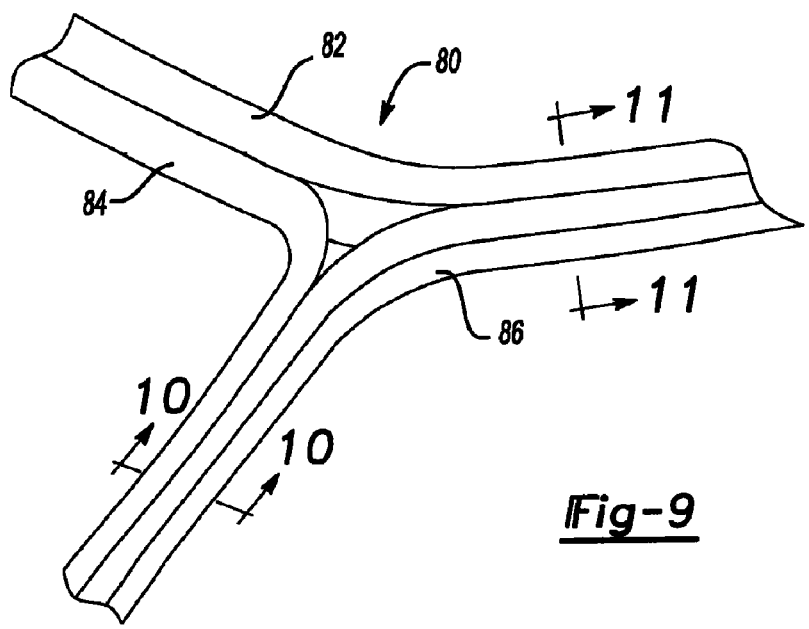
FIG. 9 is a perspective view of three hydro-formed vehicle frame components joined together.

Referring to FIG. 9, an alternative embodiment 80 of the present invention is shown wherein a roof ring 82 is attached to a windshield frame 84 and roof rail 86. In the embodiment of FIGS. 1-6, no roof ring 82 is required, but it should be understood that a roof ring 82 could be provided as part of the vehicle frame 10 that defines the passenger compartment 12.

Figure 10:
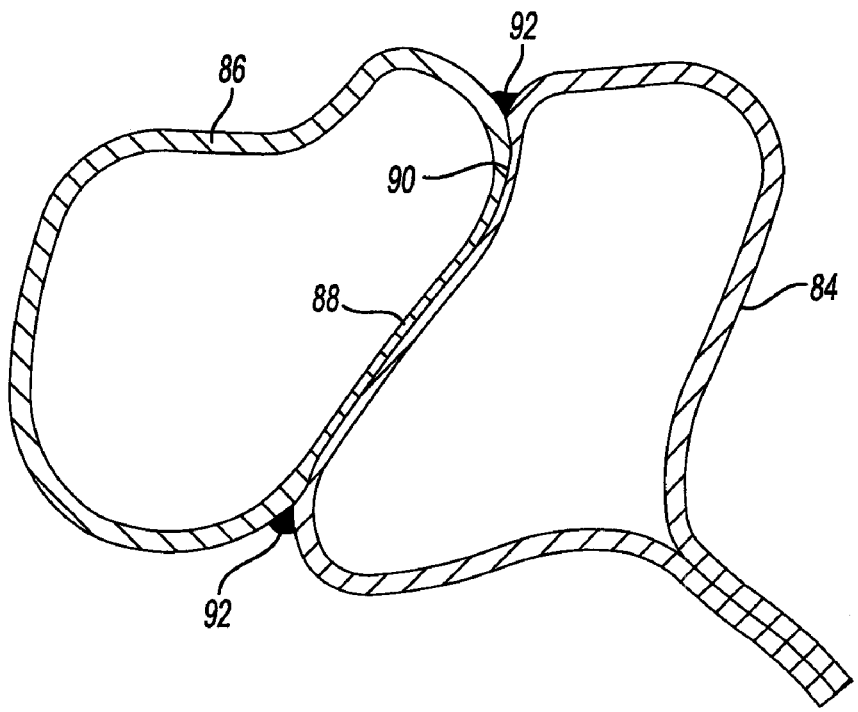
FIG. 10 is a sectional view taken along the line 10-10 in FIG. 9.

Referring to FIG. 10, a convex curved wall 88 may be provided that receives a concave curved wall 90. The convex curved wall 88 may be part of the roof rail 86 and the concave curved wall 90 may be formed as part of the windshield frame 84. Once the windshield frame 84 and roof rail 86 are located by the curved walls 88, 90, the parts are permanently joined together by welds 92. The welds 92 are formed at the seams defined by the co-location of the windshield frame 84 and the roof rail 86.

Figure 11:
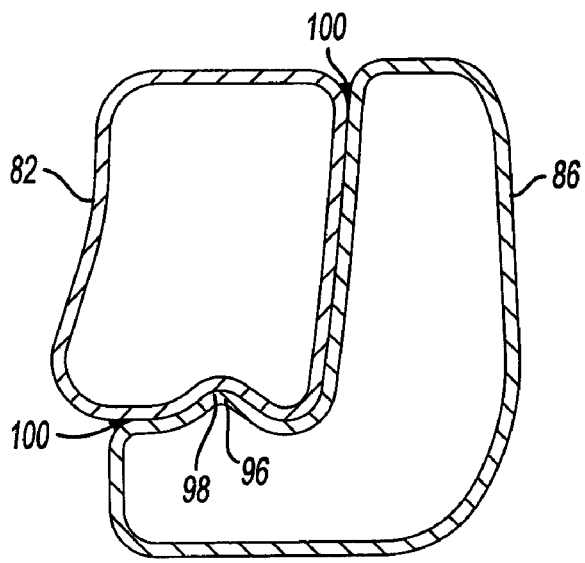
FIG. 11 is a sectional view taken along the line 11-11 taken in FIG. 9.

Referring to FIG. 11, another example of use of complimentary surface features to assemble adjacent portions of a vehicle frame together is shown. In FIG. 11, a rib 96 is formed on the roof rail 86 that is adapted to receive a recess 98 formed on the roof ring 82. The rib 96 and recess 98 are complimentary and may be used to locate the roof ring 82 relative to the roof rail 86. Welds 100 are formed preferably by a laser welding technique or other type of welding technique to join the roof ring 82 to the roof rail 86.

The method of assembling a vehicle frame 10 is described in pertinent part below.

A first vehicle frame component, such as one of the hoop assemblies 18-24, is formed by hydro-forming a portion thereof from a single piece of tubular metal. In the hydro-forming process, a first surface feature, such as feature surface 32, 44, or 54, is formed along a first mating side 56 of the first vehicle frame component. A second vehicle frame component, such as one of the hoop assemblies 18-24, is formed from a single piece of tubular metal. The hydro-forming process includes the step of forming a second surface feature that extends along a second mating side 58 of the second vehicle frame component. The second surface feature is complimentary to the first surface feature. The first vehicle frame component and second vehicle frame component are assembled together with the first surface feature and the second surface feature being interlocked together to locate the first vehicle frame component and the second vehicle frame component. The first mating side 56 is assembled flush to the second mating side 58. The first vehicle frame component is then joined to the second vehicle frame component by welding, as previously described.

The surface feature may be elongated in a first direction that is parallel to the length of the first vehicle frame component. The first vehicle frame component may also include a step 60 that extends transverse to the length of the portion of the vehicle frame component wherein the first surface is located.

The first surface feature may comprise a protrusion, such as the ridge 66 of FIG. 7, the first protrusion 72 of FIG. 8, the convex wall 88 of FIG. 10, or the rib 96 of FIG. 11. A second feature may comprise an indentation, such as the valley 68 of FIG. 7, the inside of the second protrusion 74 of FIG. 8, the concave curve wall 90 of FIG. 10, or the recess 98 of FIG. 11. The first and second surface features are complimentary formations that nest together when assembled.

The first and second frame components are permanently joined by a weld, for example, welds 70, 76, 92 or 100. As previously indicated, the weld may be a laser weld or other type of weld commonly used in assembling vehicle frame components.

The method may further comprise stamping a reinforcement beam, such as the front cross car assembly 30, rocker panels 42 or rear wall 52. The reinforcement beam is then assembled to two spaced locations on the hydro-formed component, such as the windshield frame 28 as shown in FIG. 3, or the hinge pillar and body lock pillars 36 and 40 shown in FIG. 4. Similarly, the rear wall 52 is assembled to the right and left body lock pillar portions 48, 50 of the rear hoop assembly 24. The reinforcement beam forms a sub-assembly prior to assembling the vehicle frame components, such as hoop assemblies 18-24 together to form the vehicle frame 10.

A plurality of surface features may be provided on one vehicle frame component, while a complimentary plurality of surface features is provided on the next adjacent vehicle frame component. The surface features on the first and second vehicle frame components are joined together to form, in part, the vehicle frame 10. A plurality of peripherally spaced locating surface features 32, 44, 54 may be disposed about the hoop assembly so that one vehicle frame component may be assembled and joined to multiple other vehicle frame components.

The method of assembling a vehicle frame may also be characterized by the following process. A plurality of U-shaped members may be hydro-formed so that each have a pair of spaced lower ends. The U-shaped members may comprise, for example, the windshield frame 28, the hinge pillar portion 36, roof rail portion 38 and body lock pillar portion 40, as shown in FIG. 4. The U-shaped member may also comprise the right and left body lock pillars 48, 50 and the back light frame 46. Reinforcement members comprising the front cross car assembly 30, rocker panel 42, or rear wall 52 are separately formed and then are assembled to the spaced lowered ends of their respective U-shaped members to form a sub-assembly.

The reinforcement member establishes the spread of the sub-assembly as measured between the pair of spaced lower ends. The reinforcement member also establishes the spacing between the stamped metal reinforcement member to the top of the U-shaped member. In this way, the height of the vehicle may be established.

The method of assembling a vehicle frame 10 may further comprise providing a first locating feature on a first U-shaped member. A second U-shaped member that is laterally adjacent to the first U-shaped member has a second locating feature. The second locating surface feature is complimentary to the first locating surface feature. The step of securing the sub-assemblies together further comprises joining adjacent sub-assemblies at the first and second locating features. The step of securing the sub-assembly, such as the hoop assemblies 18-24, together may further comprise interlocking first locating features of one sub-assembly with second locating features of another sub-assembly. The U-shaped portion of the sub-assemblies are located in at least two spatial axes by the first and second locating features.

The method may further comprise forming a passenger compartment pan 16 that is assembled and secured to the vehicle sub-assemblies. Two of the sub-assemblies may comprise a pair of side sub-assemblies, such as the right and left door frame hoop assemblies 20 and 22. The method may further comprise securing the side sub-assemblies relative to the passenger compartment pan 16 so that the top of the side sub-assemblies establish the height of the vehicle frame according to the location where the side sub-assemblies are assembled to the compartment pan.

The method may also further comprise assembling and joining a front sub-assembly to the passenger compartment pan. The front sub-assembly is assembled to a pair of side assemblies by joining the locating surface features of the hoop assembly 18 to the roof rail portion 38. The front sub-assembly is also secured to the front of the passenger compartment pan.

The method may also include joining a rear sub-assembly, such as the rear hoop assembly 24 to the compartment pan 16. The locating features of the rear sub-assembly are attached to complimentary surface features formed on the body lock pillar portion 40 of the door frame hoop assemblies 20, 22.

While the best mode for carrying out the invention has been described in detail, those familiar with the art to which this invention relates will recognize various alternative designs and embodiments for practicing the invention as defined by the following claims.

What is claimed:

1. A method of assembling a vehicle frame comprising:
hydro-forming two side U-shaped members that each have a pair of spaced lower ends, a front U-shaped member and a rear U-shaped member;
forming two side reinforcement members, a front reinforcement member, and a rear reinforcement member;
assembling and securing the two side reinforcement members to the pair of spaced lower ends of each of the side U-shaped members to form two side subassemblies wherein the reinforcement member establishes the spread of the side subassemblies as measured between the pair of spaced lower ends, and wherein the reinforcement member also establishes the spacing between the side reinforcement members to the top of one of the side U-shaped members; and
assembling and securing the front reinforcement member to the pair of spaced lower ends of the front U-shaped member to form a front subassembly;
assembling and securing the rear reinforcement member to the pair of spaced lower ends of the rear U-shaped member to form a rear subassembly;
joining each of the side subassemblies to the front subassembly and to the rear subassembly with each of the spaced lower ends of the U-shaped members being disposed to be laterally adjacent to one other of the spaced lower ends to form the vehicle frame.

2. The method of assembling a vehicle frame of claim 1 wherein the U-shaped member of one of the vehicle subassemblies has a first locating surface feature and the U-shaped member of one of the laterally adjacent subassemblies has a second locating surface feature which is complementary to the first locating surface feature, whereby the step of joining the subassemblies together further comprises joining the adjacent subassemblies at the first and the second locating features.

3. The method of assembling a vehicle frame of claim 2 wherein the step of joining the subassemblies together further comprises interlocking the first locating surface feature with the second locating surface feature whereby the U-shaped members are located in at least two spatial axes by the first and second locating features.

4. The method of assembling a vehicle frame of claim 1 further comprising forming a passenger compartment pan and assembling and securing the vehicle subassemblies to the passenger compartment pan.

5. The method of assembling a vehicle frame of claim 4 wherein the method further comprises securing the side subassemblies relative to the passenger compartment pan wherein the top of the side subassemblies U-shaped members establish the height of the vehicle frame.

6. The method of assembling a vehicle frame of claim 4 further comprising assembling and joining the front subassembly to the passenger compartment pan by assembling and securing a first and second locating surface feature of each of the pair of side subassemblies with a third and fourth locating surface feature of the front subassembly, and securing the front reinforcement member of the front subassembly to the passenger compartment pan.

7. The method of assembling a vehicle frame of claim 4 further comprising assembling and joining the rear subassembly to the passenger compartment pan by assembling and securing a fifth and sixth locating surface feature of each of the pair of side subassemblies with a seventh and eighth locating surface feature of the rear subassembly, and securing the rear reinforcement member of the rear subassembly to the passenger compartment pan.

\* \* \* \* \*